United States Patent [19]
Alten

[11] Patent Number: 4,862,547
[45] Date of Patent: Sep. 5, 1989

[54] TRANSFER BRIDGE FOR DOCKS
[76] Inventor: Kurt Alten, Ringstr. 14, D-3015 Wennigsen, Fed. Rep. of Germany
[21] Appl. No.: 173,276
[22] Filed: Mar. 25, 1988
[30] Foreign Application Priority Data
Mar. 27, 1987 [DE] Fed. Rep. of Germany ....... 3710109
[51] Int. Cl.⁴ .................... E01D 1/00; B65G 69/28
[52] U.S. Cl. ......................................... 14/71.1; 14/71.7
[58] Field of Search ................ 14/69.5, 71.1, 71.3, 14/71.7; 414/584
[56] References Cited
U.S. PATENT DOCUMENTS
2,993,219  7/1961  Pennington ...................... 14/71.7
4,382,307  5/1983  Alten ............................... 14/71.7
4,727,613  3/1988  Alten ............................... 14/71.1

Primary Examiner—Jerome W. Massie
Assistant Examiner—Matthew Smith
Attorney, Agent, or Firm—Becker & Becker, Inc.

[57] ABSTRACT

A transfer bridge that is pivotably mounted on a dock. The free end of the bridge plate is provided with an extension that can be retracted and extended. One or more tongues are displaceably supported by the extension. A pressure member provides a frictional force that holds the tongues against the extension and that must be overcome when the tongues are pushed in and when the tongues encounter a stop member of the bridge plate.

6 Claims, 1 Drawing Sheet

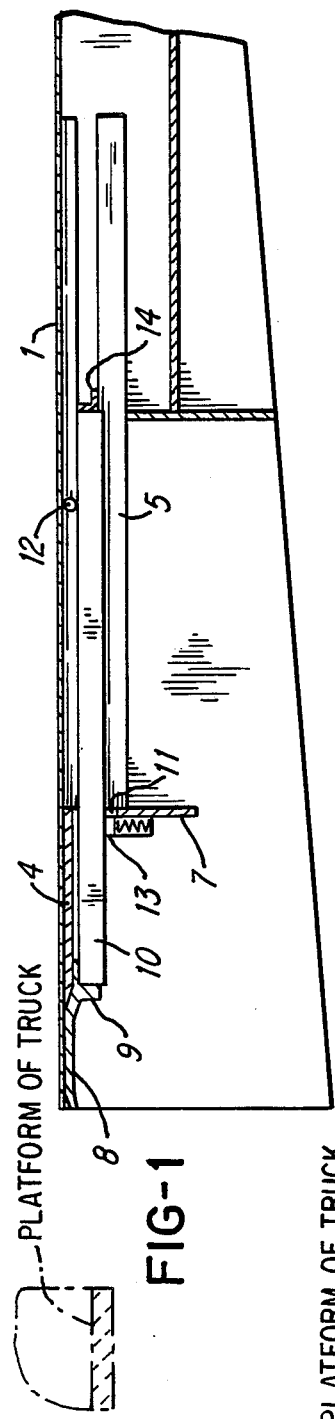
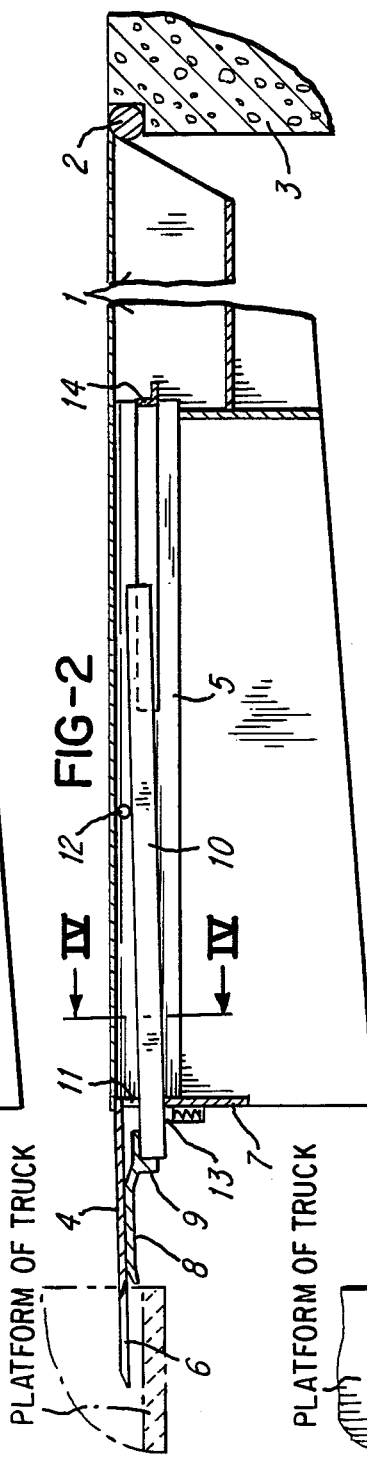
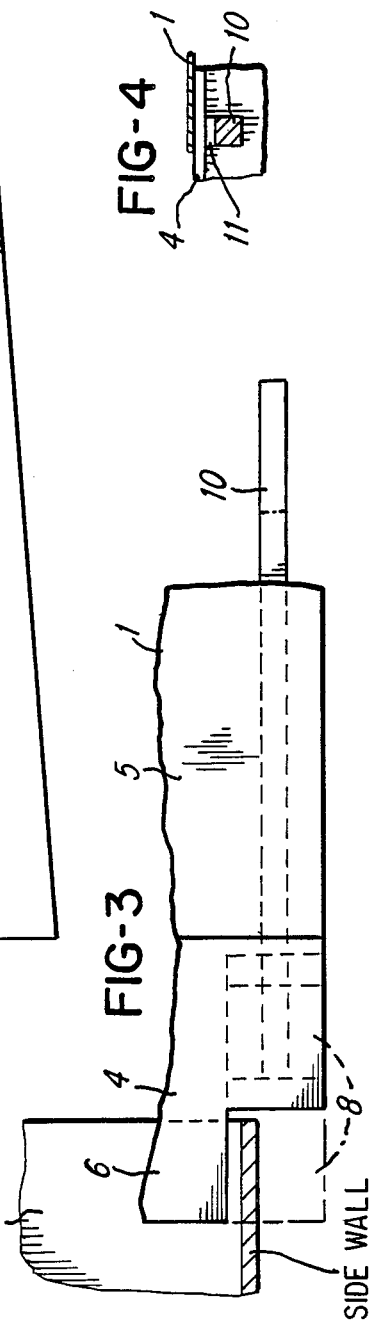

TRANSFER BRIDGE FOR DOCKS

BACKGROUND OF THE INVENTION

The present invention relates to a transfer bridge for a ramp or a dock. The bridge includes a bridge plate that at its back, dock end is pivotable about a horizontal axis, with the free front end of the bridge plate being provided with an extension that can be retracted and extended, and that can rest upon a platform that is to be loaded or unloaded.

With the heretofore known transfer bridges of this general type (see German Pat. No. 28 00 128), the extension has one or more tongues that can be pushed in against a return force. This return force is provided by a tension spring that must have a length that corresponds to the stroke of the tongues. The stop member provided in this known transfer bridge has the task of actuating the retarding action or brake.

It is an object of the present invention to improve the known transfer bridge in such a way that the long tension spring thereof can be eliminated, and in addition releasable brakes or retarding means can be eliminated, so that, with a greater operational reliability, the bridge can be technically more straightforward.

BRIEF DESCRIPTION OF THE DRAWING

This object, and other objects and advantages of the present invention, will appear more clearly from the following specification in conjunction with the accompanying schematic drawing, in which:

FIG. 1 is a partial, longitudinal, cross-sectional view through one exemplary embodiment of the inventive transfer bridge for a dock, with the extension retracted.

FIG. 2 is a partial, longitudinal cross-sectional view through the bridge of FIG. 1, but with the extension extended;

FIG. 3 is a partial plan view of the bridge of FIG. 2; and

FIG. 4 is a fragmentary cross-sectional view taken along the line IV—IV in FIG. 2.

SUMMARY OF THE INVENTION

The transfer bridge of the present invention comprises: tongue means displaceably supported by the extension; a stop member supported by the bridge plate for delimiting displacement of the tongue means in a direction toward the back end of the bridge plate; and means for providing a frictional force between the tongue means and the extension which must be overcome when the tongue means is pushed in and when the tongue means encounters the stop member.

Consequently, the tongue or tongues of the tongue means are not held by a releasable retarding means or the like, but rather are held by a frictional connection that must be overcome before the tongues can be moved. This frictional force is effective for either direction of movement of the tongues. In other words, the frictional force is equally effective for their push-in direction as for the return direction. The frictional contact, which can be effected by a simple pressure member, must of course be great enough that undesired movements of the tongues, for example when the bridge plate is swung up or during operational vibrations, cannot occur.

The tongues are pushed in when the extension is extended, or when a truck or the like that is to be loaded or unloaded approaches, and the tongues butt against a portion of the truck. The tongues return to an extended position when the extension returns to its rest position, whereby the tongues abut against a fixed stop member of the bridge plate; this abutment leads to a movement of the tongues relative to the extension. When the extension reaches its end position, the previously pushed-in tongues again attain their normal position.

Further specific features of the present invention will be described in detail subsequently.

DESCRIPTION OF PREFERRED EMBODIMENTS

Referring now to the drawing in detail, the back end of the bridge plate 1, which is of boxtype construction, is pivotably mounted to the ramp or dock 3 about a horizontal shaft 2. The lifting cylinder that is required in order to pivot the bridge plate 1 is not illustrated. Disposed at the free end of the bridge plate 1 is a longitudinally displaceable extension 4 that includes a carriage 5 that is supported against the bridge plate 1. Disposed in front of the carriage 5 is a portion 6 that is adapted to rest upon a platform that is to be loaded or unloaded. The back part of the portion 6, in the direction toward the carriage 5, is delimited by a perpendicular plate 7. The extension 4 is moved back and forth in a customary fashion by a feed cylinder, which is not illustrated.

The two side edges of the extension 4 are each provided with a square or rectangular cutout that is adapted to be occupied by a respective tongue 8 that can be pushed in in the longitudinal direction of the extension 4, i.e. in the longitudinal direction of the bridge plate 1 (see the dashed line representation in FIG. 3). One or both tongues 8 are pushed in when the overall width of the extension 4 is greater than the width of the platform that is to be loaded or unloaded. The tongues 8 can be pushed in either by the movement or action of the platform or its sidewalls, or by advancing the extension 4 until the tongues 8 abut against the platform or its sidewalls.

Each tongue 8 essentially comprises a molded part 9 that is the size of one of the two side cutouts, and also comprises a guide member 10 in the form of a solid bar that has an approximately square or rectangular cross-sectional shape. The guide member 10 serves to support the molded part 9, and extends through a similarly shaped opening 11 in the plate 7. The top of the rear portion of the guide member 10 rests against a guide roller 12. In the vicinity of the plate 7, the bottom of the guide member or bar 10 is acted upon by a spring-loaded slide block 13, which presses the upper surfaces of the tongue 8, and of the bar 10, against the adjacent parts of the transfer bridge in such a way that the tongues 8 can be shifted only by overcoming the thus generated friction, with this friction being of such a magnitude that vibrations, tilting, or other influences are unable to shift the tongues 8.

In the retracted state of the extension 4 illustrated in FIG. 1, the front edge of the molded part 9 is flush with the front edge of the extension 4, i.e. with the portion 6 thereof. If the extension 4 is now extended, and the tongue or tongues 8 are then pushed in under the aforementioned conditions, this can be accomplished only against the frictional resistance produced by the slide block 13, which is particularly effective between the molded part 9 on the one hand and that portion of the extension 4 that is disposed thereabove.

Also provided on the bridge plate 1 is an abutment or stop member 14 is in the form of a transversely extending angle iron. This stop member 14 has the following effect. Starting from the pushed-in state of the tongues 8 illustrated in FIG. 2, before the extension 4 has reached its rearmost end position, the back end of the rod 10 strikes the stop member 14. The rod 10 and the tongues 8 then maintain their position until the extension 4 has reached its rearmost end position. This operating sequence is possible because the frictional force generated by the slide block 13 can be overcome. It is, of course, to be understood that the stop member 14 must be positioned in such a way that the aforementioned conditions can be fulfilled. This means that the stop member 14 must be disposed ahead of the end position of the extension 4 by a distance that corresponds to the length of the maximum push-in stroke of the tongues 8. This distance also corresponds practically to the length of the side cutouts of the extension 4.

When a tongue 8 is loaded from above, the bottom of the bar 10 is supported on the lower edge of the opening 11, while the back end of the rod 10 is supported by the roller 12. Furthermore, the rod 10 could additionally also be protected from lateral movements by providing appropriate elements at the sides, thus providing a good guidance for the tongues 8.

Also of importance is that the contour of the tongues 8 be such that their upper surface be smooth and also blend smoothly with the surface defined by the portion 6 of the extension 4. Thus, in the non pushed-in state, no special transitions exist.

Another important thing is that the portion of the extension 4 that is disposed ahead of the plate 7, is continuous, and is not provided with the side cutouts has such a dimension in the longitudinal direction of the bridge that the molded part 9, as the tongue proper, can have its entire length in front of the plate 7 disposed below the extension 4 (see FIG. 2). Among other things, this considerably improves the stability of the active portion of the extension 4. In this connection, that portion of the extension 4 that is not provided with cutouts has a length that is approximately equal to the length of one of the cutouts, measured in the longitudinal direction of the bridge.

It should be noted that instead of providing two separate tongues 8, it would also be conceivable to provide a single tongue that extends across the entire width of the extension 4. In such a case, the side portions of the tongue would preferably be raised in such a way that these raised portions would extend into the cutouts of the extension 4 when the tongue is not in a pushed-in state, so that an even working surface would be provided for the upper surface of the extension 4.

The present invention is, of course, in no way restricted to the specific disclosure of the specification and drawing, but also encompasses any modifications within the scope of the appended claims.

What I claim is:

1. A transfer bridge for a dock, said bridge including a bridge plate that at its back, dock end is pivotable about a horizontal transverse axis, with the free front end of said bridge plate being provided with an extension that can be retracted and extended, and that can rest upon a platform that is to be loaded or unloaded; said bridge further comprises:

tongue means displaceably supported by said extension;

a fixed stop member supported by said bridge plate for delimiting displacement of said tongue means in a direction toward said back end of said bridge plate, said fixed stop member being disposed ahead of an end position of said extension by a distance that corresponds to a length of maximum push-in stroke of said tongue means; and means including a spring-loaded pressure member for providing frictional contact between said tongue means and said extension; this frictional contact holds said tongue means against said extension for either direction of movement of said tongue means and must be overcome when said tongue means is pushed in when a vehicle approaches that is to be loaded or unloaded and when said tongue means abuts against and encounters said fixed stop member.

2. A transfer bridge for a dock, said bridge including a bridge plate that at its back, dock end is pivotable about a horizontal transverse axis, with the free front end of said bridge plate being provided with an extension that can be retracted and extended, and that can rest upon a platform that is to be loaded or unloaded; said bridge further comprises:

tongue means displaceably supported by said extension;

a stop member supported by said bridge plate for delimiting displacement of said tongue means in a direction toward said back end of said bridge plate; and means for providing frictional contact between said tongue means and said extension; this frictional contact holds said tongue means against said extension and must be overcome when said tongue means is pushed in and when said tongue means encounters said stop member, said means for providing frictional contact being a slide block that is spring-loaded and acts upon said tongue means from a predetermined direction.

3. A transfer bridge according to claim 2, in which said slide block is predominantly effective in the region of the tongue means proper.

4. A transfer bridge according to claim 2, in which said extension is provided with a plate that extends perpendicular thereto and is disposed approximately below a front edge of said front end of said bridge plate when said extension is in an extended state; said slide block is disposed in the region of said plate.

5. A transfer bridge for a dock, said bridge including a bridge plate that at its back, dock end is pivotable about a horizontal transverse axis, with the free front end of said bridge plate being provided with an extension that can be retracted and extended, and that can rest upon a platform that is to be loaded or unloaded; said bridge further comprises:

tongue means displaceably supported by said extension;

a stop member supported by said bridge plate for delimiting displacement of said tongue means in a direction toward said back end of said bridge plate; and means for providing frictional contact between said tongue means and said extension; this frictional contact holds said tongue means against said extension and must be overcome when said tongue means is pushed in and when said tongue means encounters said stop member, said tongue means having a front end that is flush with said extension when the latter is retracted, and a back end that rests against said stop member of said bridge plate when said extension is retracted.

6. A transfer bridge according to claim 5, in which said extension has a back end region that faces said dock and is provided underneath with a transversely extending plate that extends approximately perpendicularly downwardly; said extension also has a front end region that is adapted to extend beyond said front end of said bridge plate in the extended state of said extension, with this front end region having a portion that is provided with cutout means for said tongue means, and a contiguous portion that extends over the width of said bridge and has a length, measured in the longitudinal direction of said bridge, that essentially corresponds to the length of the tongue means proper; whereby said tongue means, in a pushed-in state, are disposed below said contiguous portion between said plate and said cutout portion.

* * * * *